United States Patent [19]

Coombes et al.

[11] 4,214,451

[45] Jul. 29, 1980

[54] ENERGY COGENERATION SYSTEM

[75] Inventors: Graham E. Coombes, Sunnyvale; Hiranya S. Rao, Palo Alto, both of Calif.

[73] Assignee: Systems Control, Inc., Palo Alto, Calif.

[21] Appl. No.: 960,063

[22] Filed: Nov. 13, 1978

[51] Int. Cl.² ........................................... F01K 17/00
[52] U.S. Cl. ...................................... 60/648; 60/662
[58] Field of Search ................. 60/648, 662, 663, 677

[56] References Cited

U.S. PATENT DOCUMENTS

| | | | |
|---|---|---|---|
| 1,726,730 | 9/1929 | Bäckström et al. | 60/648 X |
| 3,391,539 | 7/1968 | Dimitroff, Jr. et al. | 60/648 X |
| 3,724,214 | 4/1973 | Bryant | 60/648 X |

FOREIGN PATENT DOCUMENTS 399755  10/1933  United Kingdom ...................... 60/677

Primary Examiner—Allen M. Ostrager
Assistant Examiner—Stephen F. Husar
Attorney, Agent, or Firm—C. Michael Zimmerman

[57] ABSTRACT

An energy cogeneration system of the type employed in industrial plants, such as paper mills, is described. The system utilizes the energy of steam to generate electricity, as well as to operate various industrial processes in the plant. The requirements of the processes for steam are continuously monitored, and if the requirements at any given time are significantly less than the steam being delivered thereto, the delivered steam pressure and/or temperature is reduced to make more steam energy available for other purposes.

13 Claims, 2 Drawing Figures

ENERGY COGENERATION SYSTEM

BACKGROUND OF THE INVENTION

The present invention relates to energy cogeneration systems and, more particularly, to an energy cogeneration system and a method of controlling such a system which enables the heat energy of steam not needed at any given time for processing to be utilized for the generation of mechanical and/or electrical energy.

Some industrial processes require both large amounts of electrical power, and steam or heat energy for various other purposes. For example, paper mills require significant electrical energy as well as heat energy for other purposes, such as drying. It is not unusual for a plant of this nature to have its own electrical generation system, e.g., a steam driven turbo-alternator. And because waste heat is associated with the production of electricity from steam, systems have been designed not only to produce the desired electrical output but also to enable additional heat energy to be made available for other purposes. Systems of this type are often referred to as cogeneration systems. U.S. Pat. Nos. 2,893,926; 3,064,435; 3,233,413; 3,019,933; 3,233,412; 3,488,961; 3,367,111; 3,724,214; 3,391,539; and 4,042,809 describe systems of this general type.

It has been the practice in cogeneration systems to maintain the pressure of the headers or other steam distribution means for the processing units at generally constant set-points. This is accomplished by maintaining the turbine extraction and/or exhaust pressures which feed the headers at a constant (although sometimes adjustable) set-point, and furnishing any additional steam required by the headers to maintain the constant pressure directly from the steam supply through pressure reducing stations. It will be recognized, however, that the processing units fed by the headers may have variable demand for heat energy furnished by the steam. Because of such, it has been common to also include pressure reducing valves intermediate the headers and processing units, which valves are controlled by the demands of the individual processes associated therewith. Pressure throttling at this location, however, represents loss in available energy.

SUMMARY OF THE INVENTION

The present invention matches the enthalpy and entropy requirements of the various heat demands, to improve the efficiency with which it is utilized. More specifically, the present invention monitors over a period of time the steam requirements of the processing means connected to a header and responds thereto by changing the pressure under which steam is delivered to the header to match more closely that pressure required to provide the steam needed by the processing means at any given time. The result is that any available heat energy within the pressurized steam which otherwise would be unavailable due to throttling for the process, is available for other uses, including use to generate electrical energy.

Typically in an industrial plant, steam is required not only to generate electrical power, but also for more than one processing task. These processing tasks are generally grouped together relative to their maximum steam demands, and each group is fed by a common steam header. The invention takes this into account by monitoring individually each of the processing units connected to a common header and changing the pressure of the steam delivered to such header to correspond more closely to the pressure required at any given time by the processing unit connected to the header having the maximum steam pressure requirement at such time. Moreover, the present invention is applicable to typical cogeneration systems having extraction type turbines to enable extraction of steam at the higher pressures often required by processing units. In such a conventional system, a plurality of different pressures are extracted from the turbine system to feed different headers each of which has a group of processing units communicating therewith. The present invention encompasses changing the pressure delivered to each of such headers to be consistent with that pressure required by the process unit connected to the respective header having the greatest requirement for steam at a given time.

The invention includes other features and advantages which will be described or will become apparent from the following more detailed description of preferred embodiments.

BRIEF DESCRIPTION OF THE DRAWING

With reference to the accompanying two sheets of drawing.

DETAILED DESCRIPTION OF THE PREFERRED EMBODIMENTS

Figure 1:
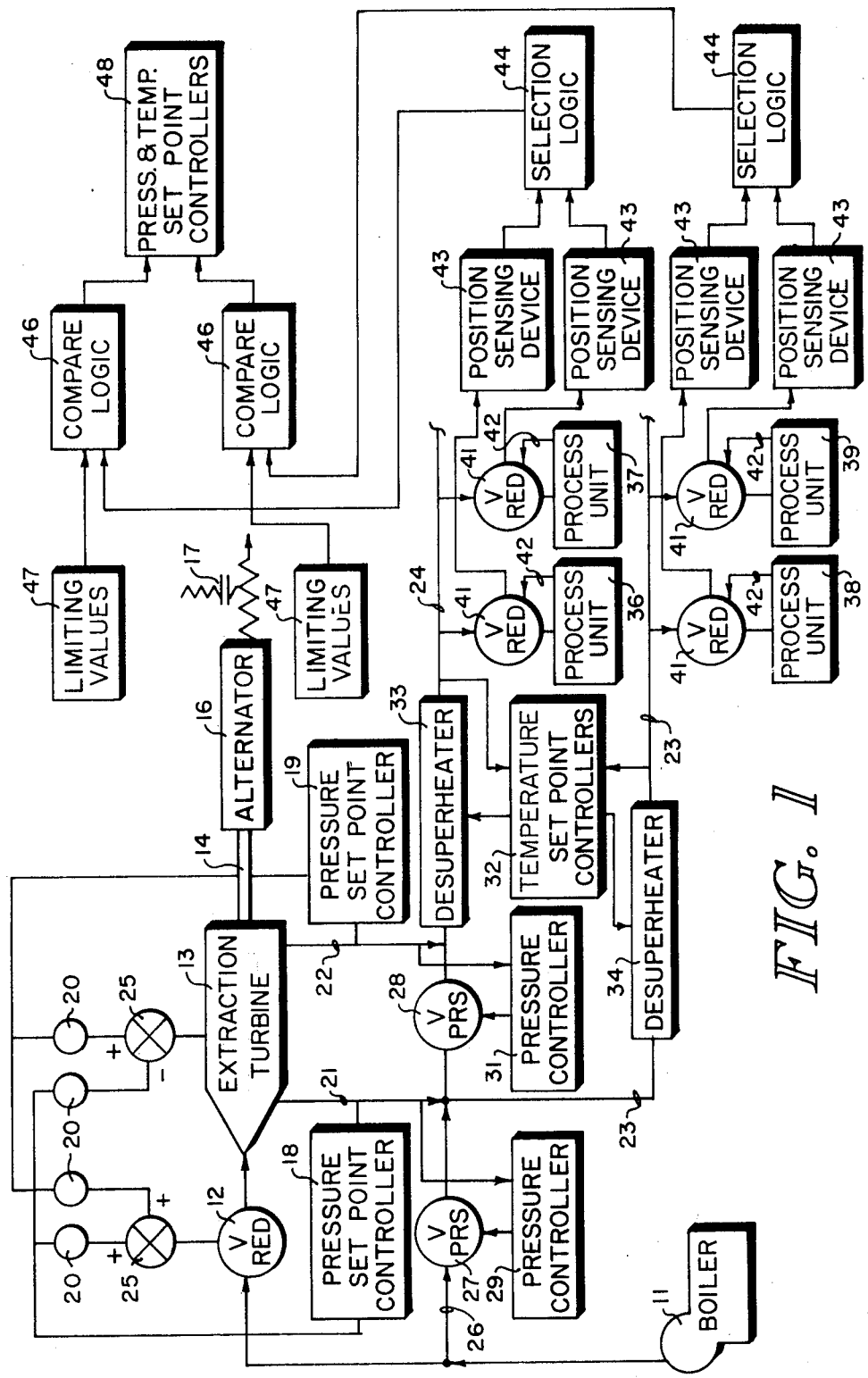
FIG. 1 is a preferred embodiment of the instant invention.

With reference first to FIG. 1, a preferred embodiment of the invention is illustrated incorporated into a conventional cogeneration system. The cogeneration system includes means to supply steam under pressure, schematically represented by the boiler 11. Steam generated within the boiler 11 is fed via a reducing valve 12 to a dual-stage, extraction turbine 13. Most desirably, turbine 13 is of the back pressure type so that steam exiting its exhaust contains available heat energy.

Turbine 13 converts the heat energy of the steam supplied thereto, to mechanical energy in the form of rotation of its output shaft 14. This mechanical energy is, in turn, converted to electrical energy via an alternator 16. While for clarity of description the extraction turbine 13 and the alternator 16 are shown as two different structures, in many situations the turbine and alternator are combined to form a turbo-alternator set.

Means are provided to control the steam outlet pressure of the turbine 13 and/or the rotational speed of the output shaft 14. As is conventional, such means includes both the valve 12 for controlling the pressure of the steam delivered to the extraction turbine, as well as internal valving in such turbine to control the flow of steam between its stages. The settings for such valves are selected to provide the desired or optimum efficiency or shaft output speed. In the embodiment shown, the generation efficiency of the turbine is optimized while the rotational speed of the output shaft 14 is held constant. In this connection, the output of the alternator 16 is linked with a utility network, and the rotational speed of the shaft 14 is controlled by virtue of synchronization with the network frequency. Electrical energy will then flow to and from the network, as represented at 17, to balance the electrical energy available to the plant, with demand.

The cogeneration system of FIG. 1 includes a typical control arrangement for such a system having a tie-line link as discussed above. A pair of pressure set-point controllers 18 and 19 sample the pressure of the steam respectively exiting the extraction outlet via line 21 and the exhaust outlet via line 22. These pressures are compared by the controllers 18 and 19 with pressure set points in order to determine the setting of the various valves for the extraction turbine via the ratio controllers 20 and adders 25. Because such control is quite conventional in the art, it will not be described in detail.

In plants in which the turbo-alternator set is designed to provide the full demand for electrical energy, which demand may vary, it is normal for the speed of the turbine output shaft to be used to control the inlet flow of the turbine, and one of the steam outlet pressures to control the turbine interstage control valve. That is, the generation of electrical energy is matched to the demand. In such a situation, a somewhat different control arrangement will be utilized as is known. The instant invention is applicable to both types of systems.

Steam from the steam supply is also fed to a pair of headers. That is, steam is extracted from the turbine via line 21 and fed to an intermediate pressure header 23 of the cogeneration system, and steam is extracted from the exhaust outlet of the turbine via line 22 and fed to a low pressure header 24. As mentioned previously, in a conventional cogeneration system the pressure of the steam respectively fed to the headers 23 and 24 is maintained constant. As an example, in a paper mill the low pressure header may typically supply steam at 50 p.s.i.g. and 310° F. while the intermediate pressure header 23, on the other hand, may typically supply steam at 150 p.s.i.g. and 380° F.

It will be recognized that in a conventional cogeneration system the pressure of the steam exiting from the extraction and exhaust outlets 21 and 22 may not be sufficient to maintain the constant pressures desired on the headers 23 and 24. It is therefore typical to provide steam makeup to such headers directly from the steam supply. This is represented in FIG. 1 by the direct connection via line 26 between such headers and the output of the boiler 11. As is illustrated, pressure reducing station valves 27 and 28 are included to control the amount, if any, of steam pressure provided directly from the supply. Such valves typically are gap-action and only supplement the flow from the turbine as required. The pressure on extraction outlet line 21 is sampled and delivered to a pressure controller 29 for operating valve 27 when needed. Similarly, the pressure on turbine exhaust line 22 is sampled by a controller 31 for valve 28.

Means are provided to desuperheat the steam delivered to each of the headers 23 and 24. That is, in accordance with conventional practice, the temperature of the steam on each of such headers is sampled and compared with a set point temperature selected to control such temperature to just above saturation for minimum condensation losses in transport and maximum heat transfer efficiency in the various processes. This is represented in FIG. 1 by blocks 32, 33 and 34. The desuperheaters 33 and 34 are, in effect, valve arrangements which allow injection of controlled amounts of water into the steam to provide the desired temperature control.

A plurality of processing means communicates with each of the headers 23 and 24 for receiving steam therefrom. These process means are represented in FIG. 1 by the blocks labeled "Process Unit"; two blocks 36 and 37 communicating with header 24, and two blocks 38 and 39 communicating with header 23. While only two of such blocks are shown connected to each of the headers, many more processing means may be connected to each. And while each of the points at which steam is bled from the described headers is referred to herein as a "process means" or "process unit", it is to be recognized that this terminology is meant to encompass other purposes for which steam might be bled from a distribution header, such as space heating, etc.

Each of the process units 36–39 communicates with its associated header via a pressure reduction valve 41. The setting of the pressure reduction valve, i.e., the degree to which each restricts flow therethrough, typically is controlled by the steam requirements of the process unit of which it is a part. These requirements will often vary over time. Because of such, the degree of throttling provided by the valve 41 associated with each process unit also varies with time. The constant pressure maintained in the header to which the respective units are communicated is selected to be at or above the maximum pressure it is expected to be required by any of the process units at any time. Thus, one or more of the pressure reduction valves 41 will be throttling steam flow at substantially all times. This represents a relatively significant waste of available energy. That is, the combination of reducing the pressure while at the same time maintaining a relatively high, generally constant pressure in the individual headers represents loss of heat energy availability.

The present invention minimizes the heat energy loss associated with the flow throttling provided by the various valves 41. It accomplishes this by monitoring the requirements of each of the processing means for steam and regulating or changing the pressure of the steam delivered to the headers to correspond more closely to that steam pressure needed at any given time to furnish the steam required by the processing means. The result is that the steam availability heretofore dissipated by the reducing valves by virtue of the constant header pressure is available for other uses, including conversion into mechanical energy by extraction turbine 13.

In keeping with the invention, position sensing devices 43 are included to sense the setting at any given time of each of the valves 41. These valve settings will be a measure at any given time of the steam requirements of the process units with which they are respectively associated. In this connection, it should be noted that while the process control pressure and temperature set points of each of the processes could be directly monitored, it is much simpler merely to monitor the process reduction valve positions. While this will not yield process temperature or pressure requirements directly, it does give a relative measure (not affected by instrument calibration) of the process requirements in relation to the current pressure and/or temperature. Of course, any non-linearity in the position of each valve relative to the degree of throttling provided by it will have to be taken into account for best accuracy.

The output for the position sensing device 43 associated with each of the headers is fed to selection logic 44 also associated with the respective headers. The function of the selection logic merely can be to determine which valve has the highest setting (minimum throttling) and whether that valve setting exceeds a maximum value (indicating an unsatisfied process demand) or is less than a minimum value (indicating excess throttling and, hence, loss of available energy). The output can be a simple order to increment or decrement by a constant amount the pressure delivered to its associated header, or to hold the header pressure at its present value. However, the selection logic preferably is designed not only to determine if one or more of the valves 41 associated with a header is providing significant pressure reduction, but also to indicate which of the valves and, hence, process units, is responsible therefor. In this connection, often the pressure or steam flow changes which various process units connected to a common header can accommodate, differ. Moreover, the response time of the process units to pressure changes also can differ. These factors preferably are taken into account by the selection logic to indicate the degree and direction of header pressure change which is demonstrated by the process units to be feasible. Most desirably, the pressure changes indicated will result in the header pressures respectively approximating at any given time the pressures required by the processing unit connected to each having the greatest requirement for steam at such time.

The selection logic outputs are fed to associated compare logic as is represented in FIG. 1 by blocks 46. The purpose of the compare logic is to determine if the degree of header pressure change indicated by the associated selection logic fits within certain constraints. In this connection, each of the headers 23 and 24 will have maximum and minimum allowable pressure and temperature values. Moreover, any change in the pressure delivered to a header will result in changes in the pressure and temperature of steam delivered to the turbine 13. The turbine stage pressure drop associated with a proposed header pressure change is checked to assure that operational and efficiency limits of the turbine are not exceeded. The limiting values associated with the headers and the turbine are represented in FIG. 1 by blocks 47.

The outputs of the compare logic sections 46, which outputs define the header pressure changes consistent with the limiting values discussed above, are used to override the pressure and temperature set point controllers, i.e., the pressure set point controllers 18 and 19 and the temperature set point controllers 32. The invention is, in this sense, a supervisory system. That is, it controls the set points of the existing cogeneration controllers to maximize the enthalphy drop in the turbine and, thus, maximize the utilization by such turbine of the heat energy available in the steam. In other words, overriding the set point controllers in this fashion automatically results in utilization by turbine 13 of the heat energy represented by the steam pressure reduction which may be saved from the headers. The existing control arrangement, including the ratio controllers 20 and the adders 25, will respond to the new pressure set points furnished by the selection logic sections 44, by assuring most efficient utilization by the turbine of the available steam. Thus, the instant invention provides significant savings in energy by taking into account the real-time need of the process units for steam in setting the header pressures.

EXAMPLE 1

Consider a cogeneration system corresponding to that illustrated in FIG. 1 in which at an initial time the steam pressures and temperatures in headers 23 and 24 are 150 psig, 380° F.; and 50 psig, 310° F., respectively; and the pressures and temperatures at the extraction and exhaust outlets 21 and 22 of the turbine are 150 psig, 510° F.; and 50 psig, 350° F. respectively. Assume that the steam being produced by boiler 11 at such initial time is at 800 psig and 850° F., and the steam entering turbine 13 after passing through control valve 12 is at 700 psig, 840° F. If the low pressure process units require $55 \times 10^6$ Btu/hour at a maximum pressure of 25 psig, and the intermediate pressure process units require $60 \times 10^6$ Btu/hour at maximum pressure of 120 psig; if desuperheater water is supplied at 200 psig, 250° F.; and if no steam passes through the pressure reducing stations 27 and 28; then the low pressure header total flow is approximately 46,200 lb/hour; the low pressure desuperheater water flow is 680 lb/hour, and the exhaust flow from the turbine is 45,520 lb/hour. Similarly, the intermediate pressure header total flow is approximately 49,800 lb/hour, the intermediate pressure desuperheater water flow is 3,530 lb/hour, and the extraction flow from the turbine is 46,270 lb/hour. For this case the mechanical energy produced in the turbine will be approximately $17.18 \times 10^6$ Btu.

Under these conditions, the pressure drop across the intermediate pressure process control valves 41 is at least 30 psig, and across the low pressure process control valves 41 is at least 25 psig. The selection logic can therefore indicate that the intermediate pressure header steam conditions can be changed to 125 psig, 365° F. (allowing at least 5 psig pressure drop across process control valves 41), and the low pressure header steam conditions to 30 psig, 280° F. (again allowing at least 5 psig pressure drop across process control valves 41).

If the process Btu requirements and desuperheater water conditions remain constant, then for the adjusted situation the low pressure header total flow will be approximately 46,810 lb/hour, the low pressure desuperheater water flow will be 250 lb/hour, and the turbine exhaust flow will be 46,560 lb/hour at 30 psig, 290° F. Similarly, the intermediate pressure total header flow will be 50,000 lb/hour, the intermediate pressure desuperheater water flow will be 2,880 lb/hour, and the extraction flow from the turbine will be 47,120 lb/hour.

Total steam flow to the turbine now will be 93,680 lb/hour compared to the initial value of 91,790 lb/hour. Assuming that the inlet steam conditions do not change, the mechanical energy generated by the turbine will be approximately $19.65 \times 10^6$ Btu, an improvement of 14.4% over the initial condition.

Further the higher total steam flow to the turbine will require the control valve 12 to operate in such a manner as to reduce the pressure drop across such valve. This will further increase the turbine mechanical energy output. In addition, if the turbine at the initial condition is operating at below design capacity, adjustment to higher flow will further increase the turbine mechanical energy output by improving the internal operation of the turbine.

Figure 2:
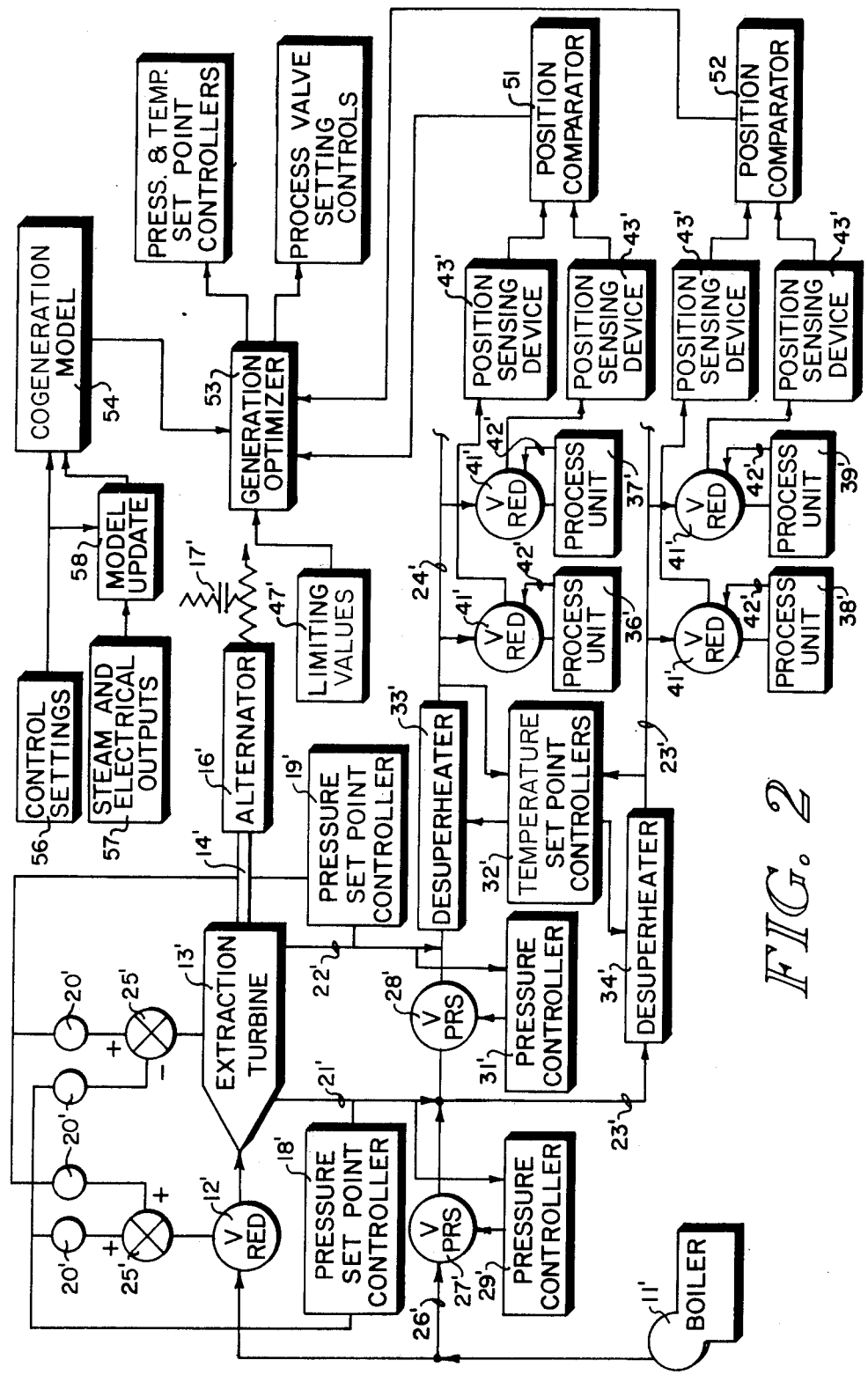
FIG. 2 is a preferred embodiment of the present invention corresponding to the best mode contemplated by the inventors of carrying out such invention.

FIG. 2 illustrates a more sophisticated embodiment of the invention which continuously optimizes header pressure for maximum electrical generation by the turbo-alternator set, while accounting more completely for turbine and other cogenerator conditions. It also assures that any changes in the header pressures are taken into account in delivering steam pressure to each of the process units.

The FIG. 2 embodiment is the same as the embodiment of FIG. 1 insofar as the conventional aspects thereof are concerned, and like parts are referred to by like, but primed, reference numerals. The outputs for the position sensing devices 43' associated with the process units connected to each of the headers are fed respectively to position comparators 51 and 52 rather than directly to change selection logic. Such position comparators compare the output of the position sensing devices to determine which of the various process units connected to a header has the greatest requirement for steam pressure at any given time, and determines how much such requirement differs from the given pressure at such time. The output of such comparators 51 and 52 are fed to a generation optimizer section 53 whose function is to calculate the settings of the various pressure and temperature controllers which will result in optimum generation of a desired electrical output while still providing the steam required by the various process units.

As a particularly salient feature of the embodiment of FIG. 2, it includes means to model the cogeneration system to enable the set point control settings to be optimized. This is represented in FIG. 2 by block 54. The model is generated from the various control settings of the cogeneration system as is represented by block 56, as well as the steam and electrical outputs, represented by block 57, resulting from such settings. The model most desirably is continuously updated to take into account changes in parameters which occur over a period of time, e.g., turbine fouling, aging, etc. This updating function is represented in FIG. 2 by block 58.

The utilization by the generation optimizer 53 of information from the cogeneration model results in a more accurate optimization of pressure header changes than can be obtained by sampling the actual parameters of the cogeneration system. Some of such parameters are not capable of being measured as a practical matter, and the model enables the same to be approximated based on other parameters. Moreover, as mentioned previously, the utilization of a model enables the parameters to be continuously updated.

The cogeneration model is a mathematical description of the overall cogeneration system. That is, it solves the functional equation:

$$y \times f(x,\theta)$$

where y = is the vector of outputs and includes variables such as electrical generation or shaft horsepower, speed of the turbo-alternator set, the temperature, pressure and flow of the steam at extractions, condensor vacuum (if applicable), and total steam flow;

and x = is the vector of state and control variables of the cogeneration system, which include turbine inlet pressure and temperature, the process valve openings, the maximum pressure (temperature) required by the processes on each steam header, turbine control valve settings, pressure reducing station settings, and desuperheater valve settings and water flow, etc.

and $\theta$ = is the vector of setpoints whose elements include setpoints for the governor speed and extraction pressure controllers, pressure reducing station controllers, and desuperheater temperature controllers.

The accuracy of the model depends on the effects and magnitude of changes in the performance and characteristics of the physical components making up the cogeneration system, as well as other factors such as the level of modeling detail. Degradation of accuracy is limited by model updating. Given a calibration of the model output with variables that can be monitored continuously, the model is updated when the deviations exceed a prespecified threshold. As an example, the heat rate (electrical generation/steam flow) of a turbine will be identical to the design heat rate unless deviations occur from design conditions due to deterioration in component performance or changes in steam conditions. The concept of model update would analyze factors which influence the heat rate and based on observed data, would relate the deviations in component performance to changes in heat rate. When the deviation exceeds specified threshold, the model for the operating heat rate is recursively updated.

Generation optimizer 53 determines the best settings of the system controls (including the set points of the extraction controllers, pressure reducing station controllers, desuperheater temperature controllers, etc.) so as to maximize the generation ratio, (KW generated/BTU to process). If the generation ratio is called J, the optimization problem then is $$\max J = f_1(y,x,\theta)$$

subject to $$f_2(y,x,\theta) = 0$$

and constraints $$x_{min} \leq x \leq x_{max}$$

$$\theta \epsilon \theta$$

where y, x and $\theta$ are defined as set forth above.

The optimization is a static optimization, and standard algorithms in mathematical programming are applicable. The result of the optimization is the determination of the control setpoints $\theta$ so that J is maximized.

While the various comparisons, modeling and optimization functions of the embodiment of FIG. 2 could be implemented by hardware logic as contemplated for the embodiment of FIG. 1, they are most simply and inexpensively implemented by appropriately programming a digital computer. It is not new to provide cogeneration system optimization utilizing digital computer techniques. However, it is new to take into consideration the realtime manner, the header pressures.

Although the invention has been described in connection with preferred embodiments thereof, it will be appreciated by those skilled in the art that various changes can be made without departing from its spirit. It is therefore intended that the coverage afforded applicants be limited only by the language of the claims and its equivalent.

We claim:

1. A method of controlling an energy cogeneration system which includes means to convert the heat energy contained in steam to mechanical energy, a header for distributing steam under pressure to at least one processing means having a need which varies over time for steam, and a steam supply means common to both said conversion means and said header, comprising the steps of:
   monitoring over a period of time the requirements of said processing means for steam distributed by said header; and
   changing in response to said monitoring means indicating that said processing means needs at any given time a different amount of steam than that represented by the steam pressure delivered to said header, the pressure so delivered to said header to a pressure which more closely corresponds to that steam pressure which is so needed.

2. A method of controlling an energy cogeneration system according to claim 1 wherein there are a plurality of said processing means communicating with said header to have steam furnished by said supply means distributed thereto; said step of monitoring the requirements of said processing means includes monitoring the individual requirements of each of said processing means; and said step of changing the pressure under which steam is delivered to said header includes changing said pressure to correspond more closely to that required by the processing means having the greatest requirement at said given time for steam.

3. A method of controlling an energy cogeneration system according to claim 2 wherein said means of said system to convert heat energy contained in steam to mechanical energy is an extraction turbine and wherein at least two of said headers are provided respectively having a plurality of processing means communicated therewith, one of which headers is communicated with the exhaust outlet of said turbine to receive steam at a relatively low pressure for distribution to a plurality of said processing means having requirements for steam at varying pressures no greater than said relatively low pressure and the other of which is communicated with an extraction outlet of said turbine to receive steam at an intermediate pressure for distribution to a plurality of said processing means having requirements for steam at varying pressures no greater than said intermediate pressure; and said step of changing the pressure under which steam is delivered to said header includes changing the pressure under which steam is delivered to each of said headers to a pressure which more closely corresponds to that steam pressure needed at any given time to furnish the steam required by the respective one of the processing means communicated therewith having the greatest requirements at said given time for steam.

4. A method of controlling an energy cogeneration system according to claim 3 wherein said step of changing the pressures under which steam is delivered to said headers includes the step of modelling the cogeneration system to optimize the set point control settings thereof consistent with said model.

5. A method of controlling an energy cogeneration system according to claim 3 wherein each of said processing means includes a pressure reduction valve communicating the same with its associated header, and said step of monitoring the requirements of each of said processing means for steam at any given time includes the step of monitoring the degree to which the pressure reduction valve associated with each of said processing means is throttling flow therethrough.

6. An energy cogeneration system comprising:
   means to supply steam under pressure;
   means to convert to mechanical energy, heat energy contained in steam furnished by said supply means;
   a header for distributing steam from said supply means under pressure to at least one processing means having a need which varies over time for steam;
   means to monitor the requirements of said processing means for steam distributed by said header; and
   means responsive to said monitoring means by changing the pressure under which steam is delivered to said header to a pressure which more closely corresponds to that steam needed at any given time to furnish the steam required by said processing means, whereby the steam furnished by said supply means not required by said processing means is available for other uses, including use by said means to convert heat energy to mechanical energy.

7. An energy cogeneration system according to claim 6 wherein there are a plurality of said processing means communicating with said header to have steam furnished by said supply means distributed thereto; said means to monitor the requirement of said processing means for steam distributed by said header includes means to monitor the individual requirements of each of said processing means; and said means responsive to said monitoring means by changing the pressure under which steam is delivered to said header changes said pressure to correspond more closely to that required by the processing means having the greatest requirement at said given time for steam.

8. An energy cogeneration system according to claim 7 wherein said means responsive to said monitoring means by changing the pressure under which steam is delivered to said header to a pressure more closely corresponding to that steam pressure required by the processing means having said greatest requirement at said given time changes said pressure to approximate that required by said processing means.

9. An energy cogeneration system according to claim 7 wherein each of said processing means includes a pressure reduction valve communicating the same with said header, and said means to monitor the requirements of each of said processing means for steam at any given time monitors the degree to which its associated pressure reduction valve is throttling flow therethrough.

10. An energy cogeneration system according to claim 6 wherein said means to convert to mechanical energy, heat energy contained in steam furnished by said supply means is an extraction turbine; and wherein at least two of said headers are provided, one of which is communicated with the exhaust outlet of said turbine to receive steam at a relatively low pressure for distribution to a processing means having a requirement for steam at varying pressures no greater than said relatively low pressure and the other of which is communicated with an extraction outlet of said turbine to receive steam at an intermediate pressure for distribution to a processing means having a requirement for steam at varying pressures no greater than said intermediate pressure; and said means responsive to said monitoring means by changing the pressure under which steam is delivered to said header changes the pressure under which steam is delivered to said respective headers to a pressure which more closely corresponds to that steam pressure needed at any given time to furnish the steam required by the respective processing means.

11. An energy cogeneration system according to claim 10 wherein each of said processing means includes a pressure reduction valve communicating the same with said header, and said means to monitor the requirements of each of said processing means for steam at any given time monitors the degree to which its associated pressure reduction valve is throttling flow therethrough.

12. An energy cogeneration system according to claim 10 wherein there are a plurality of said processing means communicating with each of said headers to have steam furnished by said supply means distributed thereto; said means to monitor the requirement of said processing means for steam distributed by said headers includes means to monitor individually the steam requirements of each of said processing means communicated with each of said headers, and said means responsive to said monitoring means by changing the pressure under which steam is delivered to said headers changes said pressures to pressures which more closely correspond to those needed at any given time to furnish the steam required by the respective processing means communicated with each of said headers having the greatest requirement at said given time for steam.

13. An energy cogeneration system according to claim 12 wherein said means responsive to said monitoring means by changing the pressure under which steam is delivered to said headers includes means to model said cogeneration system to optimize the set point control settings thereof consistent with said model.

* * * * *